United States Patent [19]
Macomber

[11] 3,766,008
[45] Oct. 16, 1973

[54] EQUINE SEMEN EXTENDER

[76] Inventor: Louis Everett Macomber, 403 Byrd St., Centralia, Wash. 98531

[22] Filed: Mar. 31, 1970

[21] Appl. No.: 24,382

[52] U.S. Cl.......................... 195/1.8, 119/1, 128/1, 128/130, 128/271, 206/84
[51] Int. Cl............................................. A01k 21/00
[58] Field of Search........................ 195/1.8; 119/1; 128/1, 271, 130, 131

[56] References Cited
UNITED STATES PATENTS

| | | | |
|---|---|---|---|
| 3,342,181 | 9/1967 | Jacquignon | 128/271 X |
| 3,234,091 | 2/1966 | Lang et al. | 424/358 X |
| 3,170,464 | 2/1965 | Forti et al. | 128/271 |
| 3,443,563 | 5/1969 | Ishihama et al. | 128/271 |
| 3,185,623 | 5/1965 | Smith et al. | 195/1.8 |
| 2,944,541 | 7/1960 | Sacchi et al. | 128/1 |
| 2,598,881 | 6/1952 | Berliner | 195/1.8 |
| 3,444,039 | 5/1969 | Rajamannan | 195/1.8 |
| 3,431,172 | 3/1969 | Rajamannan | 195/1.8 |
| 3,005,756 | 10/1961 | Van Demark et al. | 195/1.8 |
| 2,340,037 | 1/1944 | Zipper | 206/84 |
| 3,312,215 | 4/1967 | Silber | 128/131 |

OTHER PUBLICATIONS

Merkt, H. et al., Dtsch Tierarztl. Wschr. 74(20):505–507 Oct. 15, 1967 "Frozen Semen in Sealed Capsules, A Way of Improving the Pellet Technique" (in German)

*Primary Examiner*—Shep K. Rose
*Attorney*—Mason, Fenwick and Lawrence

[57] ABSTRACT

The process of extending the life in the uterus of a mare of sperm cells produced by natural breeding. The extension in life is achieved by insertion prior to natural breeding of an equine semen extender, the equine semen extender consisting of 0.5–2 parts by weight of a milk product, 0.05–2 parts by weight of a sugar nutrient, and a capsule consisting of 2–4 parts by weight gelatine enclosing and containing the milk product and sugar nutrient.

8 Claims, No Drawings

EQUINE SEMEN EXTENDER

This invention relates generally to a process and product for preserving the motility and fertility of semen produced from natural breeding within the uterus of the mare, i.e., the female of the equine species.

This invention is particularly directed to means and method for the lengthening of the period of existence of viable sperm cells within the uterus of the mare in order to enhance the possibility of conception through natural breeding processes.

In the breeding of animals, a peculiar situation exists with respect to purebred horses which does not exist with other animals. In order for a purebred horse to be registered with a particular bloodline, it is required by any of the purebred registry associations that there be a natural breeding. Presumably, the reason for this is to guarantee with precision the actual bloodline of any foal produced.

In the breeding of other animals, it is quite common to select the semen from the male, add various diluents such as, for instance, those set forth in Van Demark, U.S. Pat. No. 3,005,756, or Smith, U.S. Pat. No. 3,185,624, to preserve the semen outside of the animal, and subsequently artificially breed the female to induce conception. If this practice were followed by any breeder of horses, it would result not only in the refusal to register the foal, but also would result in the forfeiture of the breeder's rights to register offspring under any conditions with any purebred registry association. This stringent regulation requiring natural breeding to assure the preciseness of a bloodline and prevent the indiscriminate misuse of the sperm from a single stallion does achieve the primary purpose of assuring the identity of the bloodline of any registered horse, but it also imposes great burdens for the breeder of registered horses to effectively and economically utilize the stallions.

The present practice of natural breeding of horses, however, is undesirably inefficient and imprecise. Due to the fact that equine conception occurs less frequently than is desired — as is indicated from the breeding percentages in the equine industry that show a national average of about 55 to 60 percent conception — it is necessary to breed a mare two, three, or four times during the mare's heat period. With the normal high rate of breedings per conception, the stallion's capabilities are strained to the limit, particularly if the mare is to be bred every 12 to 36 hours until she passes through her heat period.

Most stallions are limited to the number of servicings that they can perform during any given period of time without an undue loss in effectiveness. The stallion, after a number of breedings, requires a period of recovery or convalescence to bring his semen quality back to acceptable fertility. Because of this quiescent period, the number of different mares that may be serviced by a single stallion is reduced if any single mare requires repeated servicing to achieve conception. Ideally, a single stallion would be capable of breeding a number of mares during the heat period provided a higher rate of conception per breeding could be achieved than exists presently.

It is also desirable to increase the rate of conception in the mare with fewer acts of breeding. This would be particularly desirable in those mares that may be difficult to breed or that may have a short heat period. It is known, for instance, that many mares go out of heat before ovulation has occurred. Since ovulation generally occurs in the last 12 to 24 hours of estrus, any one breeding may be critical to achieve conception. Conception manifestly has a far greater probability of occurring with more viable and fertile sperm cells over a longer period of time. The art never effectively achieved this in the past and, due to the short life of the sperm, the prospect of life died with the sperm.

It is therefore an object of the present invention to increase the life expectancy in a mare's uterus of sperm cells produced by natural breeding.

It is a further object of the present invention to provide equine semen extender which may be inserted into the uterus of a mare prior to a natural breeding so as to extend the life expectancy of the subsequently entering sperm cells.

This invention has as a further object increasing the probabilities of conception in a mare with fewer acts of natural breeding.

A further object of the present invention is the reduction of the number of natural breedings necessary before conception occurs in the mare.

It is also an object of the present invention to preserve and extend the breeding capabilities of the stallion to enable him to breed numerous mares during the heat period.

An important object of the present invention is to improve the prospects of breeding of horses by natural breeding means and remain within the regulations for the registering of purebred horses.

These and other objects of the present invention will be apparent upon a careful study of the following specification and accompanying claims.

It has been found that it is possible to insert an equine semen extender into the uterus of a mare prior to natural breeding such as that upon the actual act of breeding, the semen from the stallion will be extended in its life expectancy and fertility beyond that which would be normally expected. To extend the life of the equine semen, it has been found necessary to prepare the uterus of the mare to receive the semen and in the uterus to effect the extension of the life and fertility of the semen to await the ovulation that will upon union create life. It has been discovered that a milk product and a sugar nutrient enclosed within a gelatine capsule sufficiently sized to fit within the uterus of the mare prior to natural breeding, will extend the sperm life from 12 to 24 hours longer than the normal sperm cell life expectancy.

The sugar nutrient may be initially in the form of an aqueous solution, or may be in a free-flowing or fluidized powder which would readily dissolve into an aqueous solution in the capsule. The mono- and disaccharides, among which may be included dextrose, fructose, and sucrose, have been found to be particularly, though not exclusively, desirable in achieving the extension of the life of the sperm cells. The amount of the sugar nutrient that has been found to be particularly desirable is that from 0.5 to 2 parts by weight (dry).

The equine semen extender must also include a milk product such as buttermilk, whole or skim milk, or whey. The milk product may be in either a dried or liquid form but, if dried, must be fluid in the sense that it is pourable and easily dissolvable in an aqueous solution in the capsule. The amount of the sugar nutrient should be 0.05–2 parts by weight (dry).

In order (a) to achieve the proper positioning of the milk product and sugar nutrient, (b) to protect the proper proportions, and also (c) to cushion the appearance of the sperm cells as they are moved along into the uterus while establishing the most favorable environment for the sperm cells to be entering the uterus, gelatine in the form of a capsule must be used to enclose and contain both the aqueous solutions of the milk product and the sugar nutrient.

Both the sugar nutrient and the milk product must be in an aqueous solution within the capsule in order that the osmotic pressure of the semen extender is essentially the same as that of the entering semen in order to avoid loss of any of the vital ingredients in either the semen or the semen extender.

Prior art compositions may have included gelatine and certain of the other important ingredients. However, the use of gelatine in the form of a capsule to house and enclose the aqueous solution of the milk product and the sugar nutrient is an important aspect of the present invention. The gelatine capsule must be utilized to achieve the means for holding and transporting both the milk product and the sugar nutrient, but also the gelatine provides an effective cushioning action for the shock to the incoming sperm cells in order to further enhance their life expectancy.

The size and shape of the gelatine capsule is not critical to the present invention except that it must be of a volume and configuration that would fit conveniently into the uterus of the mare. Those skilled in the art would readily recognize the proper size and shape to achieve this end. Typical, but by no means limiting, sizes are those capsules that may be referred to as No. 10 (one ounce) size. The size of the capsule is essentially limited by the requirement that it be approximately between two to four parts be weight and may be the size of up to about one ounce or more.

It is important, as previously stated, to introduce into the uterus the ingredients in the capsule as aqueous solution. If the sugar nutrient or the milk product are not initially in aqueous solution, 20–45 parts by weight of sterile water must be added to the capsule to form the aqueous solution to achieve the proper osmotic pressure.

It has been found that additional ingredients may optionally be included in the gelatine capsule, along with the sugar nutrient and milk product. Among such optional ingredients are the carbohydrate alcohols having the formula $C_nH_{n+2}(OH)_n$. The amount of such carbohydrate alcohols may be 0.066–0.333 parts by weight per capsule.

Additionally, it may be desired to include a buffering agent to protect against any fluctuation in the hydrogen iron concentration in the uterus. There are a number of buffering agents that are commonly recognized for this purpose and may include those soluble salts among which may be included the alkali metal carbonates, acetates, phosphates, and citrates, or the like. Particularly included in these are sodium citrate, potassium citrate, and potassium dihydrogen phosphate that are found to be useful in effecting the desirable buffering. The preferable amounts of the buffering agent are 0.003–0.01 parts by weight.

It should be also understood that there are a great many other materials or combinations of materials that may be utilized in addition to those mentioned above to advantageously affect the sperm.

As a preferred example of the present invention: two grams of buttermilk, pasteurized powder, and 2 grams of purified dextrose were placed in a four-gram gelatine capsule (No. 10) (one ounce), and then prior to closing the capsule, 30 cc's of sterile water were added to the capsule. The capsule was closed and the contents shaken to form an aqueous solution of the dextrose and buttermilk. The gelatine capsule was then inserted through the cervix and into the uterus of the mare 30 minutes before breeding. Care was exercised to use clean techniques so as to carry as little bacteria as possible on the hands and fingers while preparing the capsule for insertion.

While 30 minutes were allowed between the insertion of the capsule and the natural breeding, it was only necessary to wait a period of time sufficient to liquefy the gelatine so that it may act as the colloid shock stabilizer, and that there be a temperature stabilization to provide the most comfortable environment for the semen. In general, anytime between one-quarter and one hour or more is suitable.

It has been found that, through the use of the foregoing method, the average number of breedings per conception was reduced by 0.4 per conception, and that the average conception rate was found to be 87 percent for 30 mares as compared to previous experience without the sperm extender of 67 to 71 percent conception.

It is anticipated that the most acceptable form of the equine sperm expander is in the dry form wherein only dry sugar nutrient and dry milk product are initially placed in the capsule. Such a partially filled capsule may be transported to the breeder who should add the 20–45 parts by weight of sterile water to form the fresh solutions in the capsule for insertion into the mare. This form of the product is not essential, but is believed to provide the greatest usefulness to the breeder who need only to add the water.

It is also contemplated that the aqueous solution of the sugar nutrient and milk product may be maintained separately from the gelatine capsule and then combined at the proper time prior to insertion into the mare.

I claim:

1. A semen-free pharmaceutical gelatin capsule equine semen extender of conventionally telescoping two-piece type hard gelatin, having a weight of not less than about one ounce and a volume and configuration that will fit conveniently by manual insertion one-quarter to one hour before a natural act of breeding, into the uterus of a naturally bred mare registered with a particular naturally bred bloodline required by a purebred registry association, said fit being convenient during the mare's heat period, ending ovulation which generally occurs in the last 12 to 24 hours of estrus, and therein, in the uterus, to extend the sperm life, from 12 to 24 hours longer than normal sperm life expectancy, of semen from an act of natural breeding during said heat period, by a naturally bred stallion registered with a particular naturally bred bloodline required by said purebred registry association, said naturally received semen in said prepared uterus of the mare having sufficiently extended life and fertility to await therein the ovulation that will upon union create life that can result in a foal registrable with said purebred registry association, without forfeiture of the breeder's right to register said offspring under said conditions, said equine semen extender substantially consisting of 0.5–2 parts by weight each of a milk product and of a sugar nutrient, said semen-free capsule consisting of 2–4 parts by weight gelatin enclosing and containing together capsule contents consisting essentially of said milk product and sugar nutrient for subsequent formation of an aqueous solution, said extender being sized to fit into the uterus of a mare prior to natural breeding in order to extend the life expectancy of the subsequently entering sperm cells.

2. The extender of claim 1 wherein said milk product is any one of buttermilk, skim milk, whole milk, and whey.

3. The extender of claim 1 wherein the sugar nutrient is selected from mono- and disaccharides.

4. The extender of claim 1 wherein the sugar nutrient is dextrose, fructose, or sucrose.

5. The extender of claim 1 including carbohydrate alcohols having the formula $C_nH_n + 2(OH)_n$ where $n$ is a whole number from 4 to 7.

6. The extender of claim 1 wherein said milk product is any one of buttermilk, skim milk, whole milk, and whey, and the sugar nutrient is dextrose, fructose, or sucrose.

7. The extender of claim 6 including carbohydrate alcohols having the formula $C_nH_n + 2(OH)_n$ where $n$ is a whole number from 4 to 7.

8. The extender of claim 1 including 20–45 parts by weight of sterile water to form solutions of said sugar nutrient and said milk product.

* * * * *